US010614354B2

United States Patent
Aydonat et al.

(10) Patent No.: US 10,614,354 B2
(45) Date of Patent: Apr. 7, 2020

(54) METHOD AND APPARATUS FOR IMPLEMENTING LAYERS ON A CONVOLUTIONAL NEURAL NETWORK ACCELERATOR

(71) Applicant: Altera Corporation, San Jose, CA (US)

(72) Inventors: Utku Aydonat, Toronto (CA); Gordon Raymond Chiu, North York (CA); Andrew Chaang Ling, Toronto (CA)

(73) Assignee: Altera Corporation, San Jose, CA (US)

( * ) Notice: Subject to any disclaimer, the term of this patent is extended or adjusted under 35 U.S.C. 154(b) by 794 days.

(21) Appl. No.: 15/017,597

(22) Filed: Feb. 6, 2016

(65) Prior Publication Data

US 2017/0103299 A1 Apr. 13, 2017

Related U.S. Application Data

(63) Continuation-in-part of application No. 14/879,928, filed on Oct. 9, 2015.

(60) Provisional application No. 62/238,598, filed on Oct. 7, 2015.

(51) Int. Cl.
*G06N 3/04* (2006.01)
*G06N 3/063* (2006.01)

(52) U.S. Cl.
CPC .............. *G06N 3/04* (2013.01); *G06N 3/0454* (2013.01); *G06N 3/063* (2013.01)

(58) Field of Classification Search
CPC .......... G06N 3/04; G06N 3/02; G06N 3/0454; G06N 3/063; G06F 15/76; G06F 3/0604; Y04S 10/54
See application file for complete search history.

(56) References Cited

U.S. PATENT DOCUMENTS

| 2011/0029471 | A1* | 2/2011 | Chakradhar | G06N 3/063 706/25 |
| 2015/0170021 | A1* | 6/2015 | Lupon | G06N 3/063 706/15 |
| 2016/0350645 | A1* | 12/2016 | Brothers | G06N 3/0454 |

OTHER PUBLICATIONS

Zidong, Du et al.: "ShiDianNao", Proceedings of the 42nd Annual International Symposium on Computer Architecture, ISCA '15, Jun. 13, 2015, pp. 92-104.*
European Search Report EP16192364, dated May 7, 2017.
Vinayak, Gokhale et al.: "A 240 G-ops/s Mobile CoProcessor for Deep Neural Networks" The IEEE Conference on Computer Vision and Pattern Recognition (CVPR) Workshop, 2014.
Maurice Peemen et al: "Memory-Centric Accelerator Design for Convolutional Neural Networks", 2013 IEEE 31st International Conference on Computer Design (ICCD), 2013, pp. 13-19.

(Continued)

*Primary Examiner* — Kamran Afshar
*Assistant Examiner* — Brent Johnston Hoover

(57) ABSTRACT

A method for implementing a convolutional neural network (CNN) accelerator on a target includes utilizing one or more processing elements to implement a standard convolution layer. A configuration of the CNN accelerator is modified to change a data flow between components on the CNN accelerator. The one or more processing elements is utilized to implement a fully connected layer in response to the change in the data flow.

20 Claims, 17 Drawing Sheets

(56) References Cited

OTHER PUBLICATIONS

Ovtcharov, Kalin et al.: "Accelerating Deep 1-15 Convolutional Neural Network Using Specialized Hardware", Microsoft White Paper Feb. 22, 2015.
Krizhevsky, et al.; "ImageNet Classification with Deep Convolutional Neural Networks"; Advances in Neural Information Processing Systems 25; 2012; pp. 1106-1114.
Zhang, et al.: "Optimizing FPGA-based Accelerator Design for Deep Convolutional Neural Networks"; FPGA.'15. Feb. 22-24, 2015, Monterey, California. USA—10 pages.
Dong Chao, et al, "Accelerating the Super-Resolution Convolutional Neural Network" Sep. 17, 2016 (Sep. 17, 2016), ECCV 2016 Conference, Springer International Publishing, pp. 391-407.
Extended European Search Report for Patent Applicatin No. 174204533. 8, dated May 4, 2018, 12 pages.
Jefkine Kafunah, "Backpropagation in Convolutional Neural Networks" DeepGrid—Organic Deep Learning, Nov. 29, 2016 (Nov. 29, 2016), pp. 1-10, retrieved from the internet, URL:http://www.jefkine.com/general/2016/09/05/backpropagation-in-convolutional-neural-networks/.
Jonathan Long, et al, "Fully convolutional networks for semantic segmentation" 2015 IEEE Conference on Computer Vision and Pattern Recognition (CVPR), vol. abs/1411.4038v2, Mar. 8, 2015 (Mar. 8, 2015), pp. 1-10.
Kalin Ovtcharov, et al, "Accelerating deep convolutional neural networks using specialized hardware" Microsoft White Paper, Feb. 22, 2015 (Feb. 22, 2015) pages, retrieved from the internet, URL:https://www.microsoft.com/en-us/research/wp-content/uploads/2016/02/CNN20Whitepaper.pdf, p. 1-p. 4.
Vincent Dumoulin, et al, "A guide to convolution arithmetic for deep learning" ARXIV ORG, Cornell University Library, 201 Olin Librray Cornell Univeristy Ithaca, NY 14853, Mar. 23, 2016 (Mar. 23, 2016).
Zhang Chen et al, "Caffeine: Towards uniformed representation and acceleration for deep convolutional neural networks" 2016 IEEE/ACM International Conference on Computer-Aided Design (ICCAD), ACM, Nov. 7, 2016 (Nov. 7, 2016), pp. 1-8.

* cited by examiner

METHOD AND APPARATUS FOR IMPLEMENTING LAYERS ON A CONVOLUTIONAL NEURAL NETWORK ACCELERATOR

RELATED APPLICATION

This application is a continuation-in-part of, and claims the benefit under Title 35, United States Code, Section 120 of U.S. application Ser. No. 14/879,928 filed on Oct. 9, 2015 and entitled "Method and Apparatus for Designing and Implementing a Convolution Neural Net Accelerator". This application also claims benefit and priority to Provisional U.S. Patent Application No. 62/238,598 filed Oct. 7, 2015 entitled "Method and Apparatus for Designing and Implementing Standard and Fully-Connected Convolution Layers on a Convolutional Neural Network Accelerator", the full and complete subject matter of which is hereby expressly incorporated by reference in its entirety.

FIELD

Embodiments of the present invention relate to tools for designing systems on target devices. More specifically, embodiments of the present invention relate to a method and apparatus for implementing layers on a convolutional neural network accelerator.

BACKGROUND

As images and videos have become more ubiquitous on the Internet, the need arises for algorithms with the capability to efficiently analyze their semantic content for various applications, including search and summarization. Convolutional neural networks (CNNs) have been shown to be effective tools for performing image recognition, detection, and retrieval. CNNs may be scaled up and configured to support large labeled datasets that are required for the learning process. Under these conditions, CNNs have been found to be successful in learning complex and robust image features.

A CNN is a type of feed-forward artificial neural network where individual neurons are tiled in a manner such that they respond to overlapping regions in a visual field. CNNs are inspired by the behavior of optic nerves in living creatures. CNNs process data with multiple layers of neuron connections to achieve high accuracy in image recognition. Developments in multi-layer CNNs have led to improvement in the accuracy of complex recognition tasks such as large-category image classification, automatic speech recognition, as well as other data classification/recognition tasks.

The limitations in computing power of a single processor have led to the exploration of other computing configurations to meet the demands for supporting CNNs. Among the areas of exploration, CNN accelerators which utilize hardware specialization in the form of general purpose computing on graphics processing units (GPGPUs), multi-core processors, field programmable gate arrays (FPGAs), and application specific integrated circuits (ASICs) have been researched.

SUMMARY

According to an embodiment of the present invention, a methodology for designing and implementing a convolutional neural network (CNN) accelerator is disclosed. The methodology utilizes an electronic design automation (EDA) tool that generates a design for the CNN accelerator in response to features of a CNN accelerator which may include characteristics and parameters of the CNN accelerator specified by a user, and available resources on a target selected by the user. The target may include one or more target devices of one or more types. The EDA tool assigns resources on the target to implement the CNN accelerator to achieve high performance. For example, resources on the target are assigned to implement appropriately sized buffers to handle the types and sizes of images to be processed by the CNN accelerator. Resources on the target are also assigned to implement the appropriate types and number of computation units, such as processing elements, to support the type of filters and layers applied by the CNN accelerator. The EDA tool also generates a sequencer unit that is programmed to coordinate the transmission of data to appropriate computation units in order to time multiplex computations on the computation units.

According to an embodiment of the present invention, a range of characteristics may be specified by the user to allow the CNN accelerator to execute a plurality of CNN algorithms. In this embodiment, one or more configurable status registers (CSRs) are implemented to allow a user to configure the target to support specified characteristics required for executing one of the plurality of CNN algorithms at runtime, after the CNN accelerator is programmed on the target. When implemented on an field programmable gate array (FPGA), the CSRs effectively allow runtime configuration of the CNN accelerator. This facilitates an FPGA overlay targeted at CNN applications.

According to an embodiment of the present invention, a method for implementing a CNN accelerator on a target includes identifying a CNN algorithm to execute on the CNN accelerator. A variation of the CNN accelerator is identified that supports execution of the CNN algorithm. The variation of the CNN may include a specific number or type of convolution layers, pooling layers, filter size, and/or filter coefficient. CSRs on the target device may be set to support the desired variation. When a different CNN algorithm is desired to be executed on the target device, a different variation of the CNN accelerator may be identified that supports the different CNN algorithm. The CSRs on the target device may be set to support the different variation of the CNN accelerator.

According to an embodiment of the present invention, a method for implementing a CNN accelerator on a target includes utilizing one or more processing elements to implement a standard convolution layer. A configuration of the CNN accelerator is modified to change a data flow between components on the CNN accelerator. The one or more processing elements are utilized to implement a fully connected layer in response to the change in the data flow.

According to an embodiment of the present invention, a CNN accelerator implemented on a target includes a sequencer unit that coordinates a first data flow between components on the target during a first configuration and that coordinates a second data flow between components on the target during a second configuration. The CNN accelerator also includes a plurality of processing elements that implement a standard convolutional layer during the first configuration, and that implement a fully connected layer during the second configuration.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
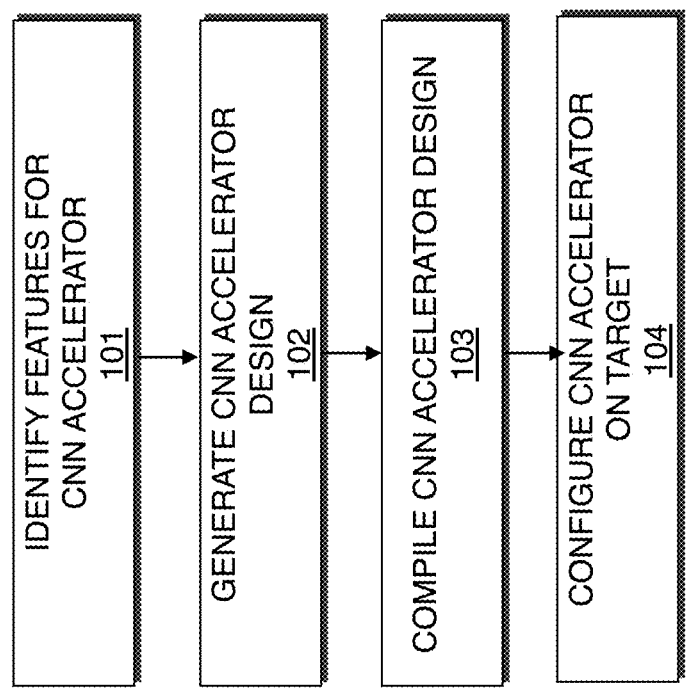
FIG. 1 is a flow chart illustrating a method for designing and implementing a convolutional neural network (CNN) accelerator according to an exemplary embodiment of the present invention.

FIG. 1 is a flow chart illustrating a method for designing and implementing a convolutional neural network (CNN) accelerator according to an exemplary embodiment of the present invention. The procedures described in FIG. 1 may be performed by an electronic design automation (EDA) tool and an CNN accelerator configuration tool on a computer system. The procedures described may also be performed in combination with other tools or systems. At 101, features of a design for the CNN accelerator are identified. According to an embodiment of the present invention, identifying features of the design include identifying characteristics and parameters for the CNN accelerator, and resources available on a target implementing the CNN accelerator. It should be appreciated that when the CNN accelerator is desired to support more than one CNN algorithm, a plurality or range of characteristics and parameters may be identified. According to an embodiment of the present invention, the features of the design for the CNN accelerator may be provided in a high level design language such as OpenCL or other design language.

At 102, a design for the CNN accelerator is generated. According to an embodiment of the present invention, an architecture description of the design for the CNN accelerator is generated in response to the features of the CNN accelerator. The design for the CNN accelerator may be optimized for the target implementing the CNN accelerator. According to an embodiment of the present invention, the design for the CNN accelerator may be generated in a high level design language or a hardware description language.

At 103, the design for the CNN accelerator is compiled for the target. According to an embodiment of the present invention, compilation involves performing synthesis, placement, routing, and timing analysis procedures on a hardware description language of the design. The compiled design for the CNN accelerator supports a range of CNN variants.

At 104, the CNN accelerator is configured on the target. According to an embodiment of the present invention, the target is programmed using the compiled design of the CNN accelerator. The target is further configured to implement a variation of the CNN accelerator to support execution of a desired CNN algorithm. During runtime, further configurations may be applied to implement other variations of the CNN accelerator to support execution of other CNN algorithms.

Figure 2:
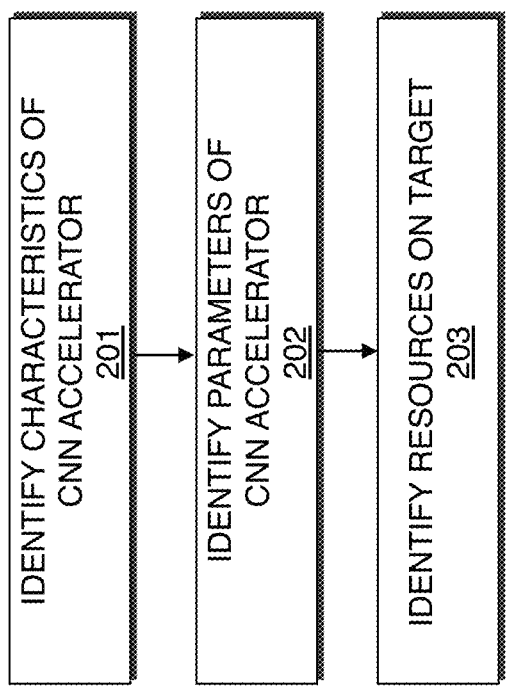
FIG. 2 is a flow chart illustrating a method for identifying features of a CNN accelerator according to an exemplary embodiment of the present invention.

FIG. 2 is a flow chart illustrating a method for identifying design features for a CNN accelerator according to an embodiment of the present invention. The procedures described in FIG. 2 may be used to implement procedure 101 in FIG. 1 and may be performed by an EDA tool executed on a computer system. At 201, characteristics of the CNN accelerator are identified. According to an embodiment of the present invention, identifying the characteristics for the CNN accelerator may include identifying characteristics of one or more CNN algorithms that the CNN accelerator is desired to support. The characteristics of a CNN algorithm may include a number and sequence of stages of layers, such as convolution (standard convolutional) and noise filtering layers. The noise filtering layers may include, for example, pooling, normalization, and rectified linear (ReLU) layers. The characteristics of the CNN algorithm may also include sizes and coefficients of filters, and sizes, strides, and padding of images to be processed. According to an embodiment of the present invention, a stride of an image corresponds to a number of pixels that may be skipped in an input when performing convolution and may be used to adjust a number of output results. Padding of an image relates to values added to a perimeter of an image and may be used to match input and output images. It should be appreciated that other characteristics may also be identified.

Figure 3:
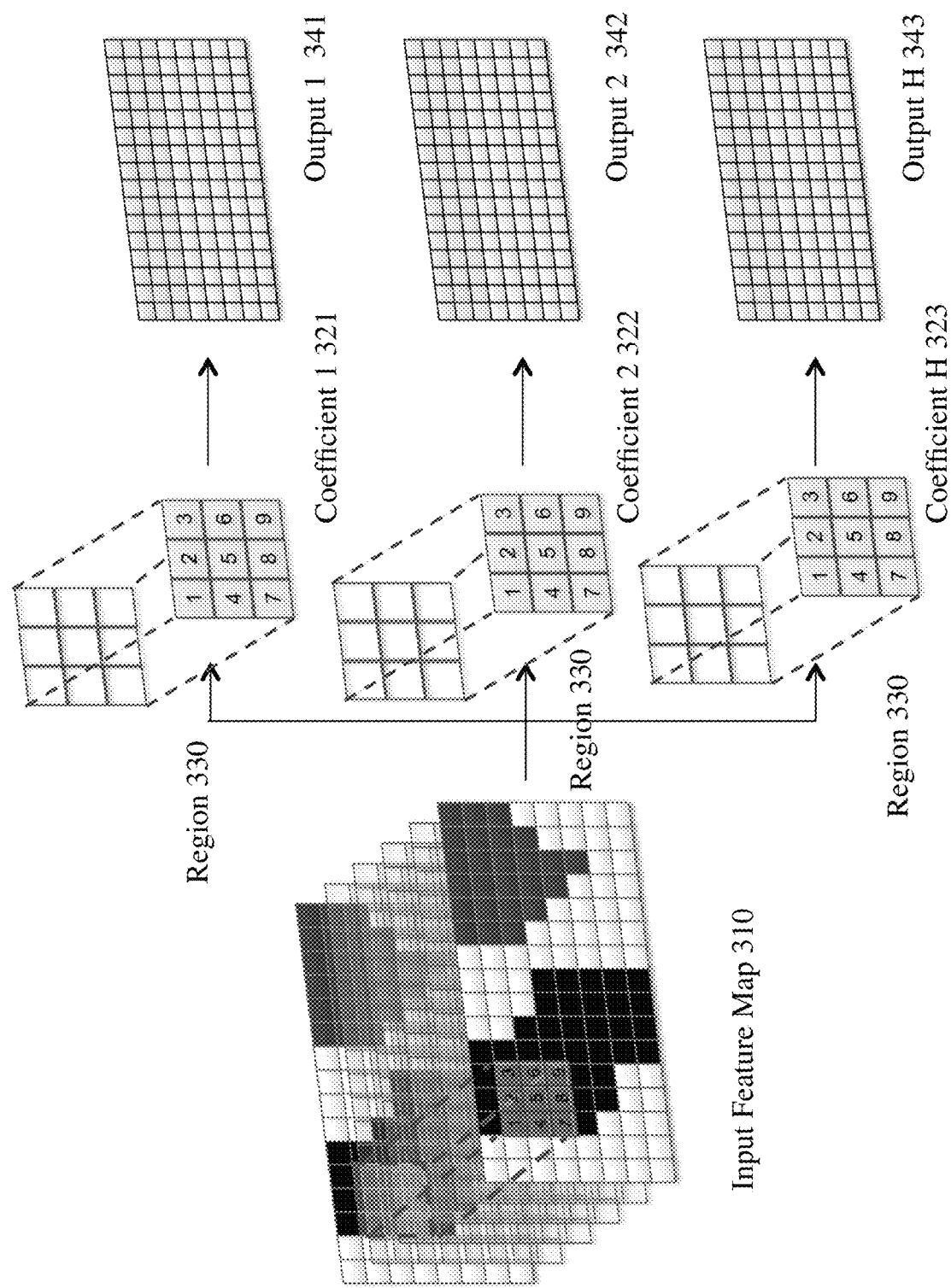
FIG. 3 illustrates an example of a standard convolutional layer implemented by an exemplary embodiment of the present invention.

FIG. 3 illustrates an example of a standard convolution layer implemented by an exemplary embodiment of the present invention. The standard convolution layer may be one of the layers identified at 201, described with reference to FIG. 2. The standard convolution layer receives input features from an input feature map 310. The standard convolution layer also receives a set of coefficients 321-323 generated through a training of the convolution layer. The coefficients 321-323 apply weights which formulate a filter for the convolution layer. The standard convolution layer performs a 3-dimensional dot product between a region 330 defined within the input features 310 and the coefficients 321-323. The result of each convolution operation is an output at the same (x, y) horizontal and vertical coordinates within the output planes 341-343. Applying the same set of coefficients on different feature regions produces different (x,y) outputs on each output plane 341-343. Therefore, in order to produce the entire (x,y) output planes, the standard convolution layer receives a stream of different input features while applying the same set of coefficients 321-323. According to an embodiment of the present invention, a single (x,y) output generated by a single standard convolution over a kxkxD input region 330 may be represented with the following relationship.

$$\text{output} = \sum_{c=0}^{D} \sum_{r=0}^{k} \sum_{s=0}^{k} \text{feature}[c][r][s] * \text{coef}[c][r][s]$$

In the relationship above, D represents an input depth, and k represents a height and width of a region in an input feature map. Different kxkxD coefficient data is used to compute every (x,y) output plane of each convolution layer. Hence, for instance, if a convolution layer has H output planes, a total of HxkxkxD coefficient data is needed for this convolution layer. However, the same HxkxkxD coefficient data is used in the same convolution layer when processing different images.

Figure 4:
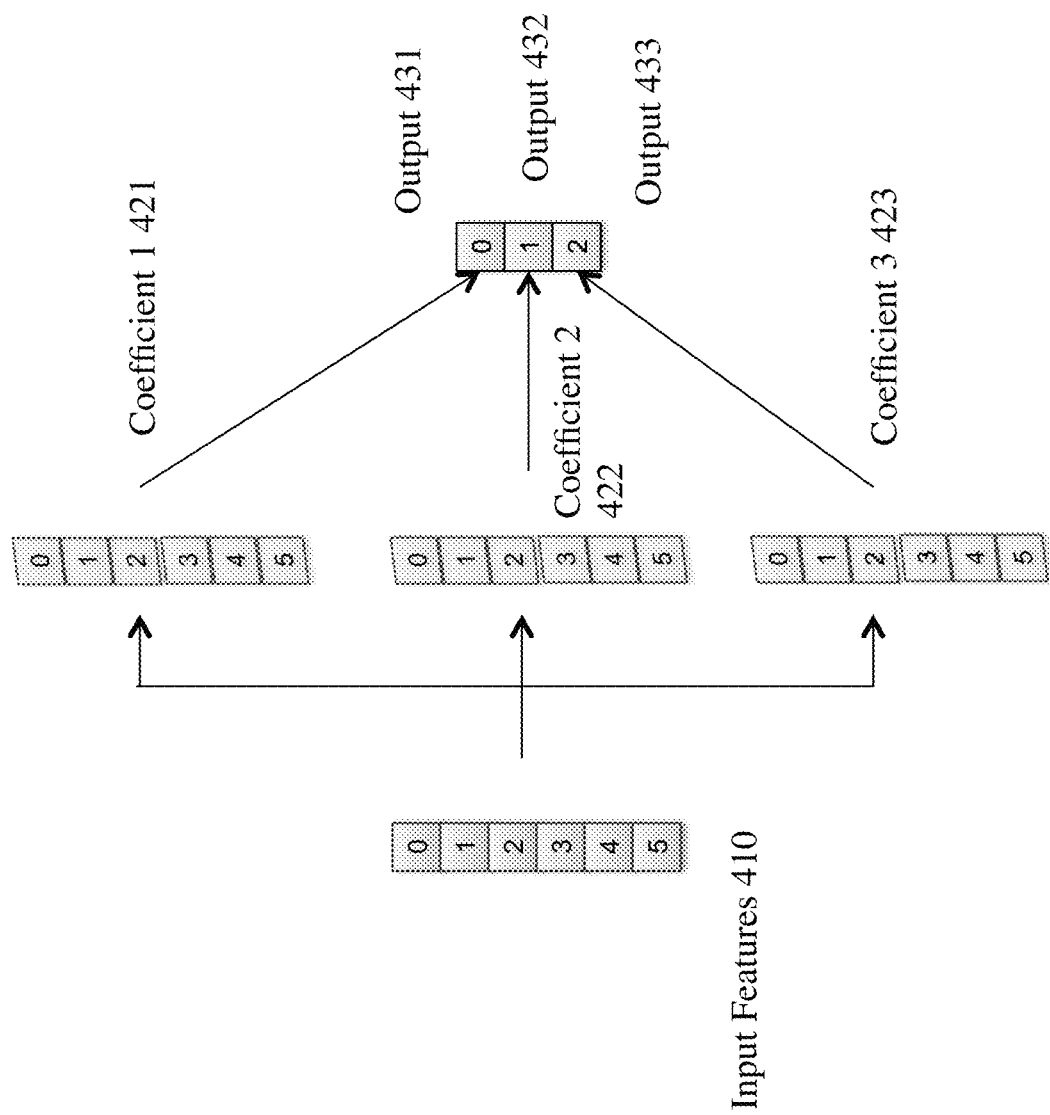
FIG. 4 illustrates an example of a fully-connected layer implemented by an exemplary embodiment of the present invention.

FIG. 4 illustrates an example of a fully-connected layer implemented by an exemplary embodiment of the present invention. The fully-connected layer receives input features 410 which represent all the feature data from an input feature map. The fully-connected layer also receives a set of coefficients 421-423 generated through a training of the fully-connected layer. The coefficients 421-423 apply weights which formulate a filter for the fully-connected layer. The fully-connected layer takes a 1-dimensional dot product between the input features 410 and the set of coefficients 421-423. The results of the operation are outputs 431-433 which form the output feature map. If the output size is Z, and the input size is N, then the total size of the coefficients is ZxN, i.e. the total size of the coefficient data is larger than the size of the features. Hence, in order to compute the entire output feature map, the fully-connected layer receives a stream of different coefficients while applying a same input features 410 of the same image. According to an embodiment of the present invention, a single output z may be represented with the following relationship.

$$\text{output}[z] = \sum_{i=0}^{N} \text{feature}[i] * \text{coef}[z][i]$$

In the relationship above, N represents the size of the input feature map and z represents the index of the output feature that is computed, where the total size of output feature map is Z. Different coefficient data is used to compute the output features of different fully connected layers. However, the same ZxN coefficient data is used in the same fully connected layer when processing different images.

Referring back to FIG. 2, at 202, parameters of the CNN accelerator are identified. According to an embodiment of the present invention, identifying parameters for the CNN accelerator may include identifying parameters for the one or more CNN algorithms that the CNN accelerator is desired to support. The parameters of a CNN algorithm may include a number of processing elements to instantiate for each layer identified, and a number of multiplications to execute for each cycle of a kernel. It should be appreciated that other parameters may also be identified.

At 203, resources available on a target to implement the CNN accelerator are identified. According to an embodiment of the present invention the target may include one or more target devices of one or more target device types. The resources identified may include a number and type of memory blocks, digital signal processors (DSPs), and other components and processing units on a target device. According to an embodiment of the present invention, the features of the CNN may be identified from input provided by the user or from other sources.

Figure 5:
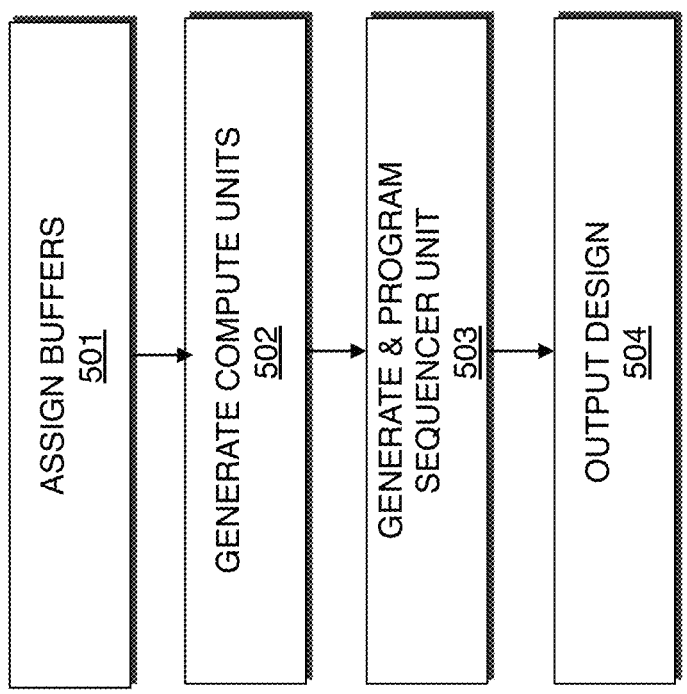
FIG. 5 is a flow chart illustrating a method for generating a design for a CNN accelerator according to an embodiment of the present invention.

FIG. 5 is a flow chart illustrating a method for generating a design for a CNN accelerator according to an embodiment of the present invention. The procedures described in FIG. 5 may be used to implement procedure 102 in FIG. 1 and may be performed by an EDA tool executed on a computer system. At 501, buffers on the CNN accelerator are assigned an appropriate size to support a size of images to be processed by the CNN accelerator. According to an embodiment of the present invention, the design for the CNN accelerator architecture is structured such that there is one read port and one write port for each buffer. This ensures an efficient implementation that does not require arbitration to access data in the buffer. According to one embodiment, double buffering is supported to allow writing of new intermediate results from a convolution stage while reading results from a previous stage in a different location in the buffer.

At 502, computation units are generated to support the CNN algorithms to be performed by the CNN accelerator. According to an embodiment of the present invention, the computation units include kernels that perform convolution and noise filtering. The computation units may be generated to maximize performance utilizing resources available on a target implementing the CNN accelerator. The resources available on the target that may be utilized may include DSP blocks, memory blocks, shift registers, and adders. In one embodiment, dot product computations performed by kernels are organized to leverage vector modes supported by reconfigurable DSP blocks on the target. In another embodiment, pool layers utilize shift register resources available on the target.

At 503, a sequencer unit is generated. The sequencer unit coordinates transmission of data to appropriate processing elements on the CNN accelerator at appropriate times in order to time multiplex computations on the processing elements. According to an embodiment of the present invention, the sequencer unit is programmed to perform the coordination required to support the algorithms performed by the CNN accelerator. The sequencer unit may be generated using logic array blocks, registers, and/or a hard or soft processing unit available on a target device.

At 504, a description of the design is generated. According to an embodiment of the present invention, the description of the design may be in a hardware description language (HDL) format or other format.

Figure 6:
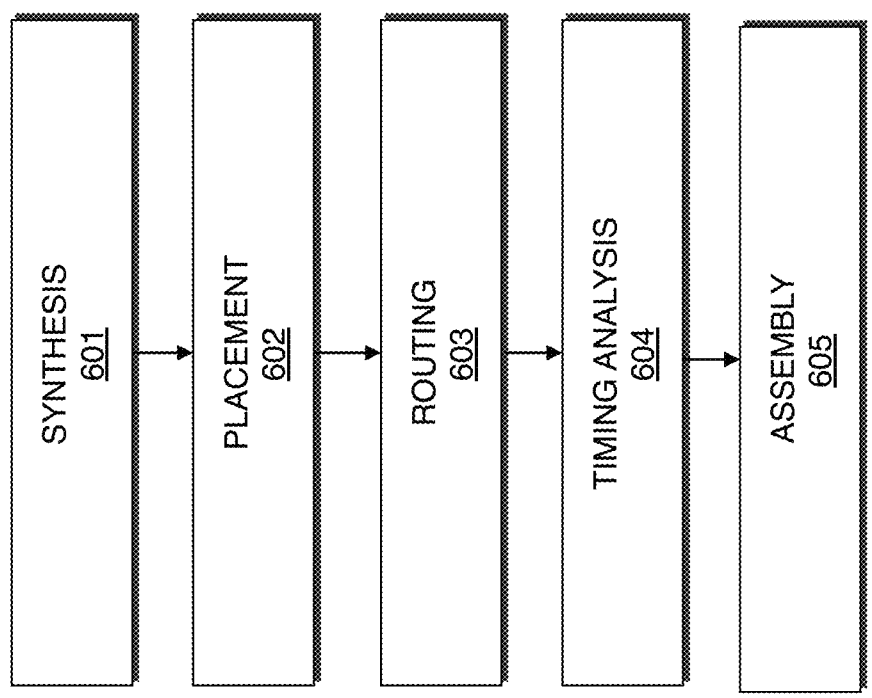
FIG. 6 is a flow chart illustrating a method for compiling a design for a CNN according to an exemplary embodiment of the present invention.

FIG. 6 is a flow chart illustrating a method for compiling a design for a CNN accelerator on a target according to an exemplary embodiment of the present invention. The target may be one or more field programmable gate arrays (FPGAs), application specific integrated circuits (ASICs), structured ASICs, or other programmable device. The procedures described in FIG. 6 are referred to as a compilation flow. The procedures may be used to implement procedure 103 in FIG. 1 and may be performed by an EDA tool executed on a computer system.

At 601, a design for the CNN accelerator is synthesized. Synthesis includes generating a logic design of the system to be implemented by the target. According to an embodiment of the present invention, synthesis generates an optimized logical representation of the system from an HDL design definition. The optimized logical representation of the system may include a representation that has a minimized number of functional blocks, such as logic gates, logic elements, and registers, required for the system. Synthesis also includes mapping the optimized logical representation. Mapping includes determining how to implement logic gates and logic elements in the optimized logic representation with the types or categories of resources available on the target. The resources available on the target may be referred to as "cells" or "components" and may include logic-array blocks, registers, memories, DSP blocks, input-output elements, and other components. According to an embodiment of the present invention, a netlist is generated from mapping. This netlist may be an optimized technology-mapped netlist generated from the HDL.

At 602, the system is placed. According to an embodiment of the present invention, placement involves placing the technology-mapped logical system design on the target. Placement includes fitting the system on the target by determining which specific resources on the target are to be assigned to and implemented by the technology-mapped netlist determined during synthesis. Placement may include clustering which involves grouping logic elements together to form the logic clusters present on the target.

At 603, the placed design is routed. During routing, routing resources on the target are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 604, timing analysis is performed on the design of the system. According to an embodiment of the present invention, the timing analysis determines whether timing constraints of the system are satisfied. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 605, assembly is performed. The assembly procedure involves creating a configuration file that includes information determined by the procedures described at 601-604. The configuration file may be a bit stream that may be used to program the target to implement the CNN accelerator. Programming the target physically transforms programmable resources on the target into the design of the CNN accelerator.

Figure 7:
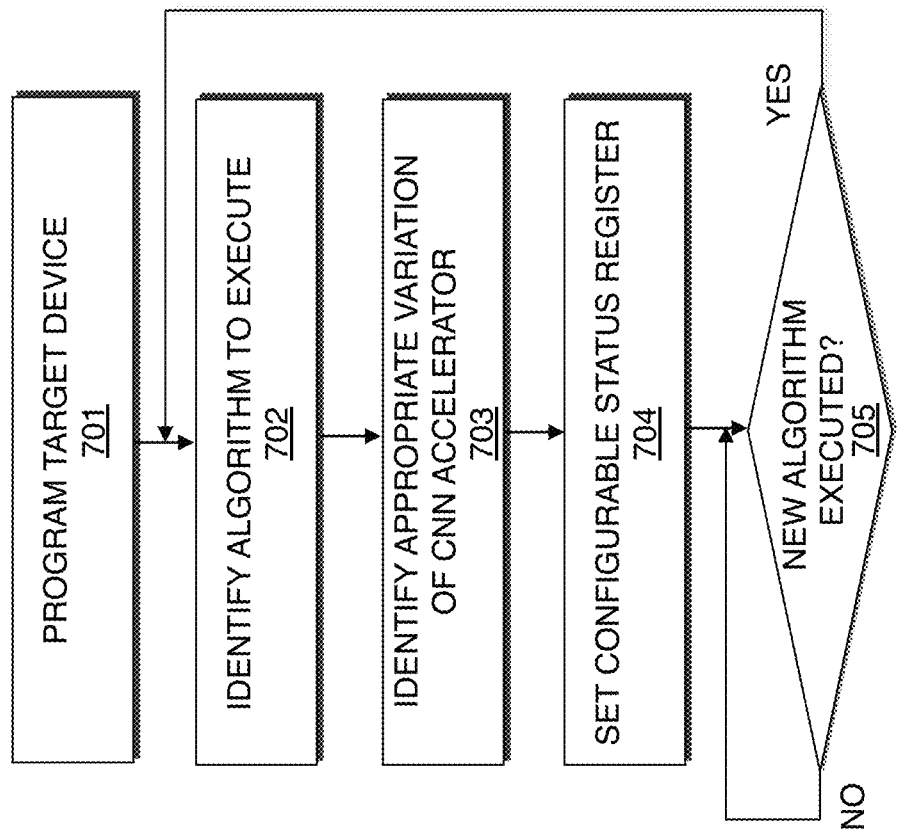
FIG. 7 is a flow chart illustrating a method for configuring a CNN accelerator on a target according to an exemplary embodiment of the present invention.

FIG. 7 is a flow chart illustrating a method for configuring a CNN accelerator on a target according to an exemplary embodiment of the present invention. The procedures illustrated in FIG. 7 may be used to implement procedure 104 in FIG. 1 and be performed by a CNN accelerator configuration tool on a computer system. At 701, a target is programmed to implement the CNN accelerator. According to an embodiment of the present invention, programming the target involves programming one or more target devices with a configuration file that physically transforms the one or more target devices into the design of the CNN accelerator.

At 702, a CNN algorithm to be executed by the CNN accelerator is identified. According to an embodiment of the present invention, the CNN algorithm to be executed may be identified from user input or from another source.

At 703, an appropriate variation of the CNN accelerator that supports the CNN algorithm to be executed is identified. According to an embodiment of the present invention, the appropriate variation of the CNN accelerator may be identified from user input or from another source.

At 704, one or more configurable status registers are set to support the variation of the CNN accelerator. According to an embodiment of the present invention, setting a configurable status register may add or subtract a convolution layer on the CNN accelerator, add or subtract one or more noise filtering layers, or change a size of a filter.

At 705, a determination is made as to whether a new CNN algorithm is to be executed by the CNN accelerator. According to an embodiment of the present invention, the determination may be made in response to user input. If a determination is made that a new CNN algorithm is to be executed by the CNN accelerator, control proceeds to 702. If a determination is made that a new CNN algorithm is not to be executed by the CNN accelerator, control returns to 705.

FIGS. 1-2, and 5-7 are flow charts that illustrate embodiments of the present invention. The procedures described in these figures may be performed by an EDA tool and a CNN accelerator configuration tool implemented by one or more computer systems. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 8:
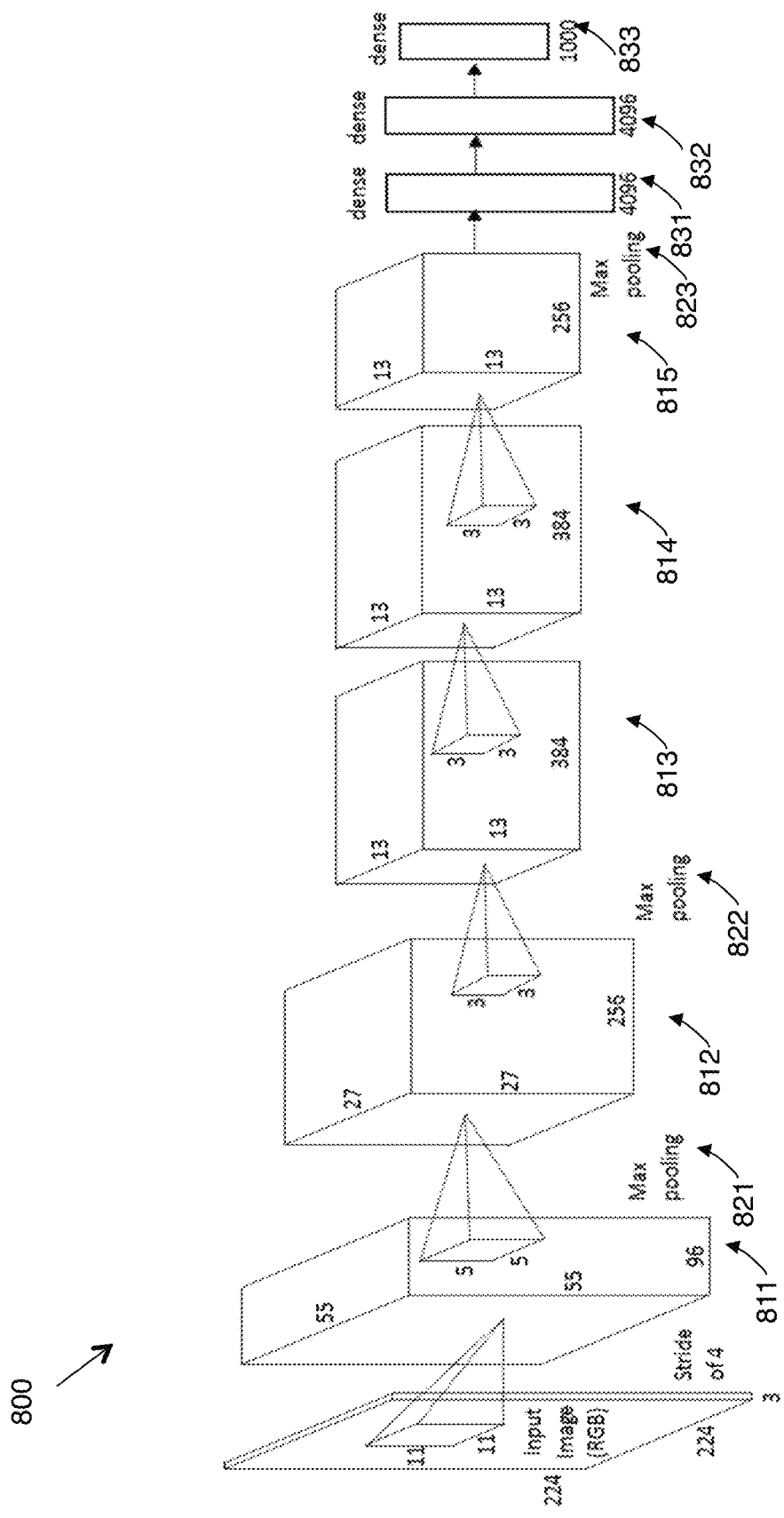
FIG. 8 illustrates an exemplary CNN according to an exemplary embodiment of the present invention.

FIG. 8 illustrates a conceptual view of an exemplary CNN algorithm 800 that may be implemented according to an exemplary embodiment of the present invention. The CNN 800 includes a plurality of layers where each layer transforms one volume of activations to another volume through a differentiable function. The CNN 800 includes five convolution layers 811-815. The convolution layer computes an output of neurons that are connected to local regions in an input. The convolution layer computes a dot product between its coefficients (weights) and the region it is connected to in an input volume. According to an embodiment of the present invention, each of the convolution layers 811-815 may perform the operations described with reference to the standard convolution layer described in FIG. 3.

The CNN 800 includes three max-pooling layers 821-823. A pooling layer performs a down-sampling operation along spatial dimensions. Pooling layers reduce variance by computing a maximum or average value of a particular feature over a region of an image. This ensures that a same result will be obtained even when image features have small translation. This operation may be used for object classification and detection.

The CNN 800 includes three fully-connected layers 831-833. The fully-connected layers 831-833 perform high-level reasoning. The fully-connected 831-833 layers take all neurons from a previous layer and connect them to every neuron in its layer. According to an embodiment of the present invention, each of the fully-connected layers 831-833 may perform the operations described with reference to the fully-connected layer described in FIG. 4.

It should be appreciated that a CNN may include other layers. For example, one or more ReLU layers may be used to apply an element-wise activation function such as max (0,x). The ReLU layer increases non-linear properties of a decision function and of an overall CNN without affecting the receptive fields of a convolution layer.

Figure 9:
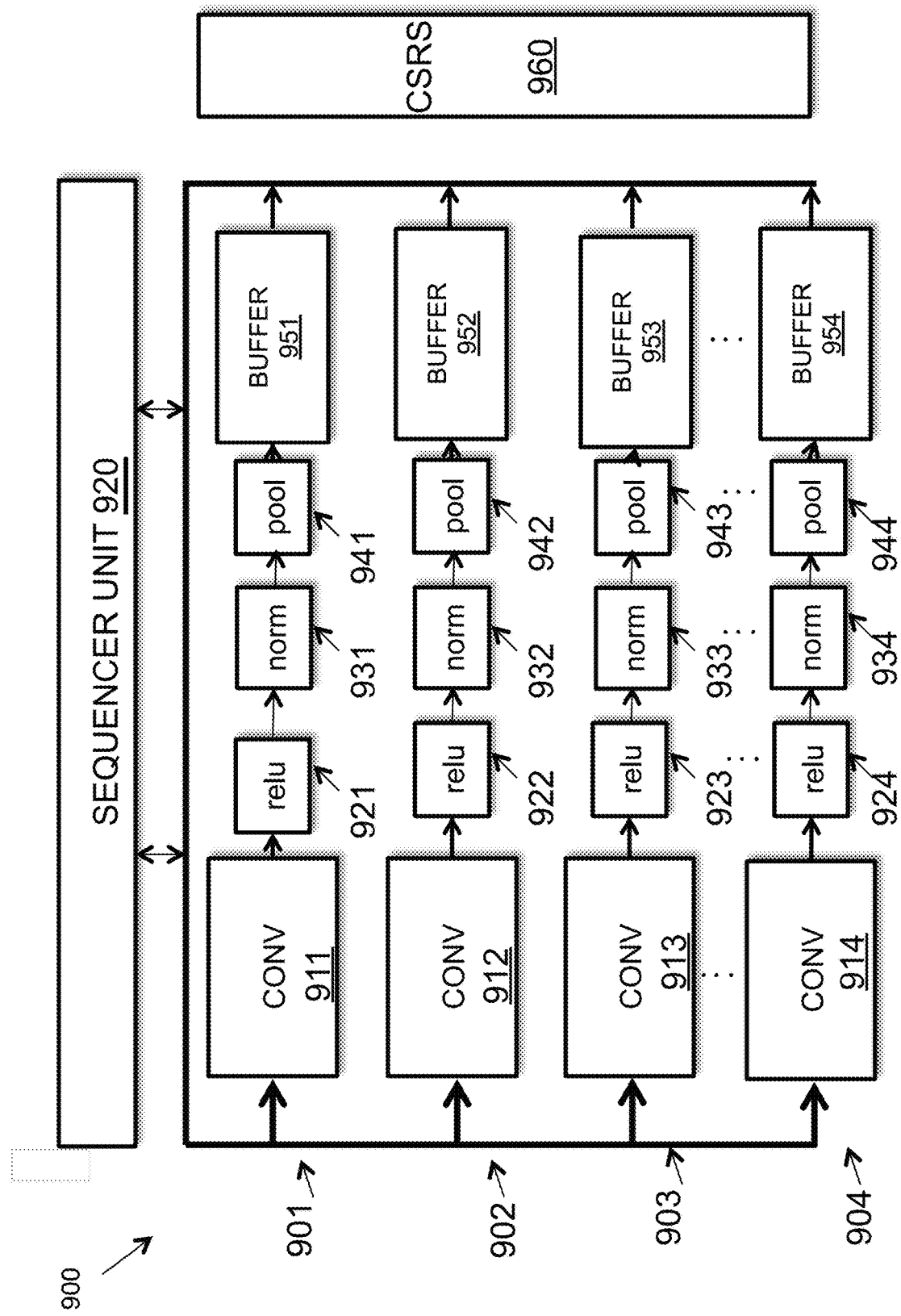
FIG. 9 is a block diagram of a CNN accelerator according to an exemplary embodiment of the present invention.

FIG. 9 is a block diagram of an exemplary CNN accelerator 900 that may be used to implement a CNN according to an embodiment of the present invention. The CNN accelerator 900 allows for efficient computation of forward propagation of convolution and other layers. The CNN accelerator 900 accepts an input image (feature map) and may apply multiple convolution and other layers in succession.

Input image pixels are transmitted into the processing element (PE) arrays 901-904 which may perform independent dot-product operations in a convolution procedure. PE array 901 represents a first PE array and PE array 904 represents an nth PE array, where n can be scaled to any number. According to an embodiment of the present invention, each PE array includes hardware components that support layers such as a convolution layer, ReLU layer, normalization layer, and pooling layer.

A sequencer unit 920 orchestrates the sequencing, addressing, and delivery of data to each of the PE arrays 901-904, kernels in each of the PE arrays 901-904, and components in each of the kernels. The sequencer unit 920 coordinates the transmission of data to appropriate PE arrays 901-904 in order to time multiplex computations on the PE arrays 901-904. The accumulated results from the PE arrays 901-904 may be transmitted to one of the buffers 951-954 which transmits the computed output layer back to kernels and components in the PE arrays 901-904 for a next round of layer computation. The buffers 951-954 reside on a target device implementing the CNN accelerator 900 and may be referred to as on-chip buffers.

The CNN accelerator 900 includes configurable status registers (CSRs) 960. The CSRs 960 are programmable by a user during runtime to modify various aspects of the CNN accelerator 900. For example, the CSRs 960 may be set to add or subtract a number of convolution layers used by the CNN accelerator 900, add or subtract one or more pooling, ReLU, or other layers used by the CNN accelerator 900, and/or change a size of a filter supported by the CNN accelerator 900. The CSRs 960 may be coupled to each of the components of the PE arrays 901-904.

According to an embodiment of the present invention, each of the PE arrays 901-904 includes a first kernel 911-914, that supports a convolution layer, a second kernel 921-924, that supports a ReLU layer, a third kernel 931-934, that supports a normalization layer, and a fourth kernel 941-944, that supports a pooling layer. The output of the fourth kernel, 941-944, is transmitted to a buffer 951-954 from where it may be fed back into the first kernel 911-914 for the next convolution stage. According to an embodiment of the present invention, a single kernel may support the normalization layer. In this embodiment, the single normalization kernel would be connected to kernels 921-924 that support the ReLU layer. It should be appreciated that each of the PE arrays 901-904 may include kernels that implement layers other than the ones illustrated in FIG. 9, such as fully-connected layers. According to an embodiment of the present invention, the first kernels 911-914 may be used to implement both convolution layers and fully-connected layers.

Although buffers 951-954 are shown to be connected to the fourth kernels 941-944 in the PE arrays 901-904, it should be appreciated that buffers 951-954 may be directly connected to any of the kernels in the PE arrays 901-904. According to an embodiment of the present invention, the first kernels 911-914 in the PE arrays 901-904 are directly connected to the buffers 951-954 and may store data in the buffers 951-954 without routing the data through any other kernel.

Figure 10:
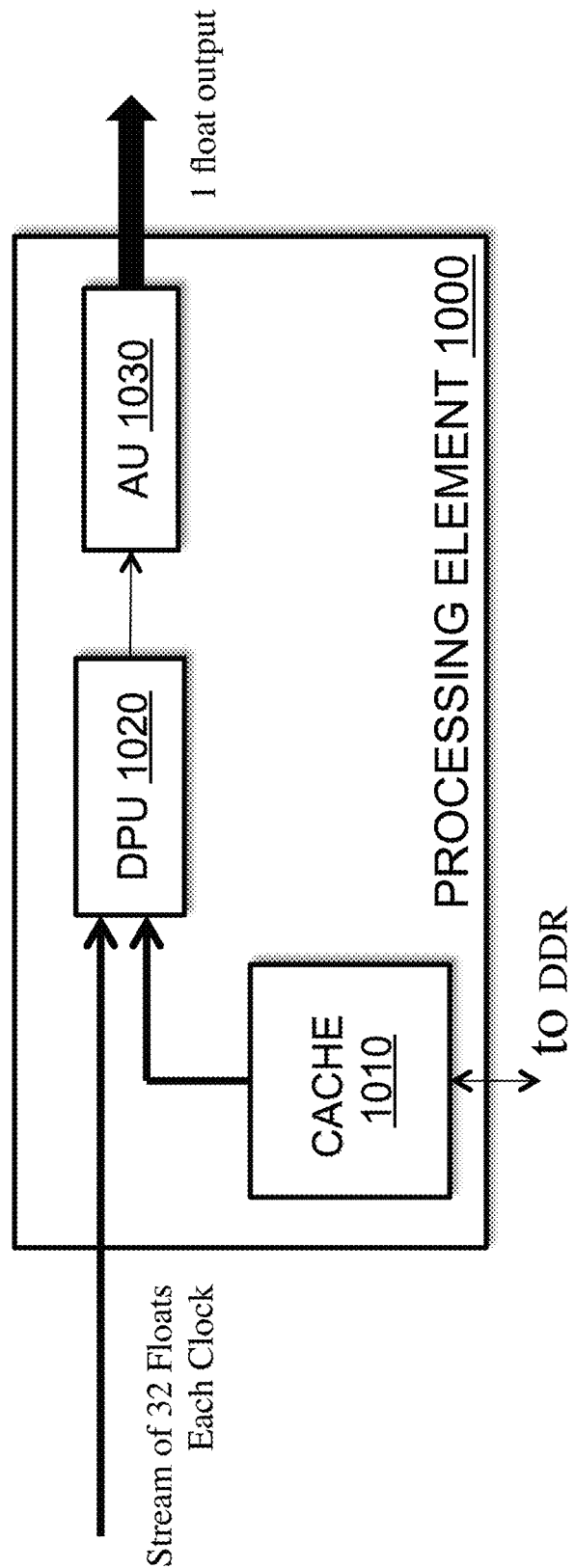
FIG. 10 is a block diagram illustrating a processing element according to an exemplary embodiment of the present invention.

FIG. 10 is a block diagram illustrating an exemplary processing element 1000 according to an exemplary embodiment of the present invention. The processing element 1000 may be used to implement any one of the first kernels 911-914 illustrated in FIG. 9 that supports a convolution layer. It should be appreciated that the processing element 1000 may also be used to support a fully-connected layer. According to an embodiment of the present invention, the processing element 1000 includes a cache 1010 for storing recycled, repeated data. The cache 1010 may be implemented using a memory block on a target device. The processing element 1000 includes a dot product unit 1020 that computes N-float dot products every clock cycle. According to an embodiment of the present invention, N is configured at 202. The dot product unit 1020 receives streaming, non-repeated data and recycled, repeated data. The dot product unit 1020 may be implemented using one or more DSP blocks on the target. The processing element 1000 includes an accumulator unit 1030. The accumulator unit 1030 accumulates dot product results as partial sums until an entire computation is completed. The accumulator unit 1030 may be implemented using a logic array block.

One or more processing elements may be used together with off-chip memory interfaces, on-chip buffers, and control logic to route data into and out of the one or more processing elements to support computations performed by a variety of algorithms. These computations include matrix multiplication, and 1D/2D/3D convolutions. One or more processing elements may also be used to implement both a standard convolution layer and a fully-connected layer at different instances of time. The number of processing elements and their configurations may be adjusted to match the performance and resource requirements of the CNN algorithm.

A first input to the processing element 1000 may be used to stream in non-repeated data. A second input to the processing element 1000 is used to stream in repeated data that is used more than once. The non-repeated data may be stored in an on-chip buffer and streamed in directly into the dot product unit 1020. Repeated data may be read from an external memory and stored in the cache 1010. The cache 1010 may be utilized to take advantage of temporal locality of the repeated data.

When implementing a standard convolution layer using one or more of the processing elements, feature map data is treated as non-repeated data and stored in on-chip buffers 951-954. The output of one convolution layer is streamed into a next convolution layer. Each processing element receives the same streaming feature data that belongs to the same image every cycle to compute an output in the same (x,y) output coordinates in different output planes. Coefficient data is treated as repeated data since the same set of coefficients is used to compute different output feature maps in the same (x,y) output plane. The coefficient data is read into the cache 1010 of the processing element 1000. Different caches store different coefficient data needed to process different output planes. The coefficient data may be read into the cache 1010 from an external memory, but is not written back. Utilizing the cache 1010 reduces required accesses to the external memory.

When implementing a fully-connected layer using one or more of the processing elements, coefficient data is treated as non-repeated data and is stored in on-chip buffers 951-954. The coefficient data is treated as non-repeated data since different sets of coefficient data are used to compute different output features of each image. Sets of coefficient data are read once from external memory, stored on on-chip buffers, and streamed into processing elements. Alternatively, coefficient data may also be streamed directly from DDR without being stored on on-chip buffers. Fully connected layers are computed using a batch mode; a number of images are processed simultaneously in that each processing element applies the same fully connected layer for a different image. Since the same coefficient data is used for different images, each processing element receives the same coefficient data every cycle to apply to different feature data that belong to different images and to compute different output features of different images. Feature data is treated as repeated data. The input features are read from external memory into the cache 1010. The caches in different processing elements store features data for different images. Input feature data is treated as repeated data since the same input feature data is used to compute different output features of the same image. The final output feature maps computed are stored in external memory.

Figure 11:
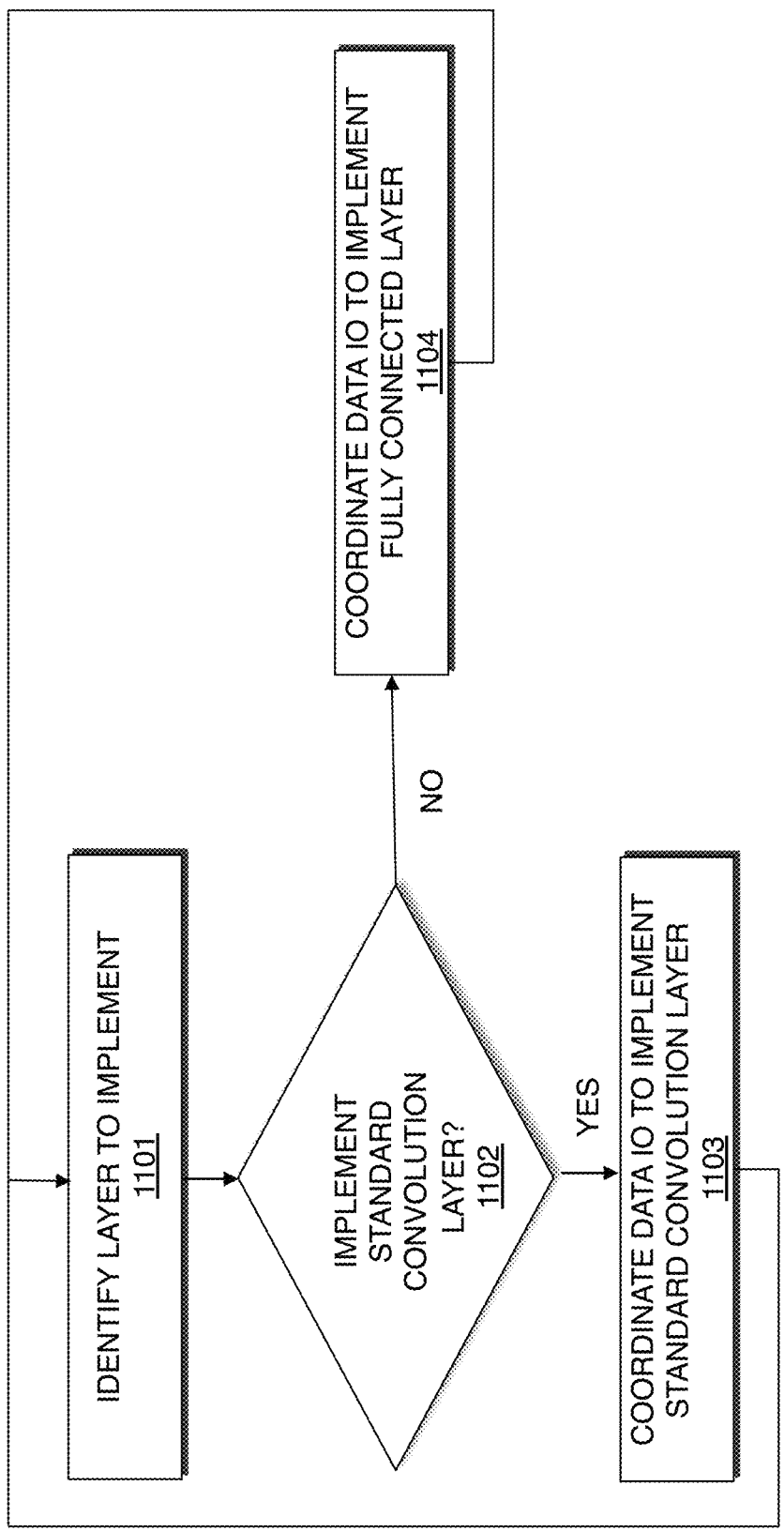
FIG. 11 is a flow chart illustrating a method for utilizing one or more processing elements to implement a standard convolutional layer and a fully connected layer according to an exemplary embodiment of the present invention.

FIG. 11 is a flow chart illustrating a method for utilizing one or more processing elements to implement a standard convolutional layer and a fully connected layer according to an exemplary embodiment of the present invention. The method illustrated in FIG. 11 may be performed by a sequencer unit such as the sequencer unit 920 illustrated in FIG. 9. At 1101, a layer to implement on a CNN accelerator is identified. According to an embodiment of the present invention, the layer to implement may be identified from characteristics of the CNN accelerator and tracking a stage in which data is being processed by the CNN accelerator.

At 1102, it is determined whether the layer to implement is a standard convolution layer. If the layer to be implemented is a standard convolution layer, control proceeds to 1103. If the layer to be implemented is not a standard convolution layer, control proceeds to 1104.

At 1103, data flow is coordinated to implement a standard convolution layer. The data flow that is coordinated includes data input and output to and from one or more processing elements and components residing on and off the CNN accelerator.

At 1104, data flow is coordinated to implement a fully connected layer. The data flow that is coordinated includes data input and output to and from one or more processing elements and components residing on and off the CNN accelerator. It should be appreciated that the procedures illustrated in FIG. 11 may be repeated such that control returns to procedure 1101 after procedures 1103 or 1104 are completed.

Figure 12:
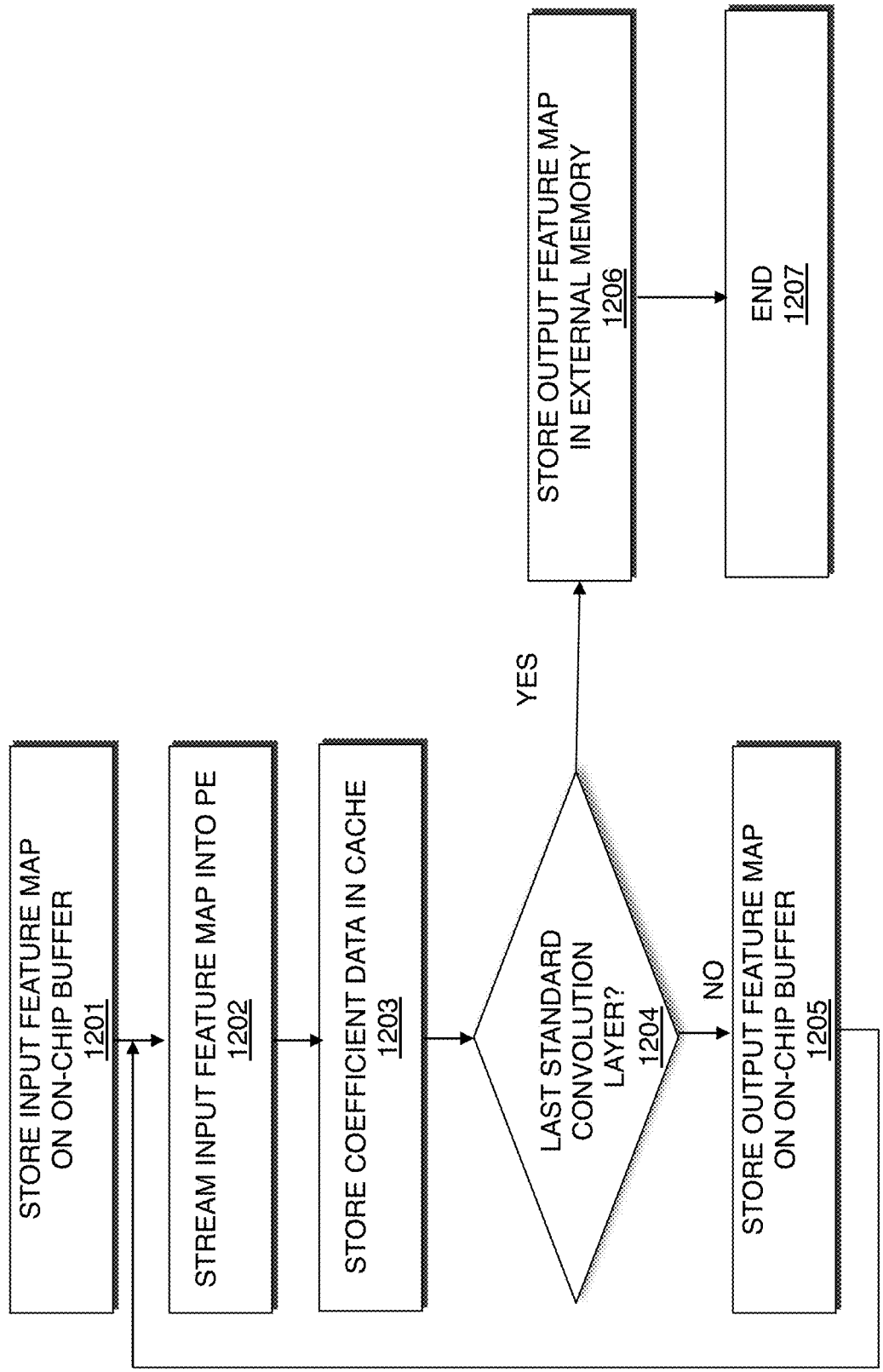
FIG. 12 is a flow chart illustrating a method for managing data input and output on a CNN accelerator to utilize one or more processing elements to implement a standard convolutional layer according to an exemplary embodiment of the present invention.

FIG. 12 is a flow chart illustrating a method for managing data input and output on a CNN accelerator to utilize one or more processing elements to implement a standard convolutional layer according to an exemplary embodiment of the present invention. The method described in FIG. 12 may be used to implement procedure 1103 illustrated in FIG. 11. At 1201, an input feature map is stored on an on-chip buffer.

At 1202, data from the input feature map is streamed into a processing element from the on-chip buffer.

At 1203, coefficient data is stored in a cache of the processing element. The input feature map streamed into the processing element and the coefficient data stored in the cache of the processing element may be processed by the processing element in the manner described with reference to FIG. 3 to generate an output feature map.

At 1204, it is determined whether a present standard convolution layer is a last standard layer to be implemented for processing the feature map. If the present standard convolution layer is not the last standard convolution layer to be implemented, control proceeds to 1205. If the present standard convolution layer is the last standard layer to be implemented, control proceeds to 1206.

At 1205, the generated output feature map is stored on the on-chip buffer. Control returns to 1202.

At 1206, the generated output feature map is stored in an external memory. The external memory may reside off the target implementing the CNN accelerator. Control proceeds to 1207 where the procedure is terminated.

Figure 13:
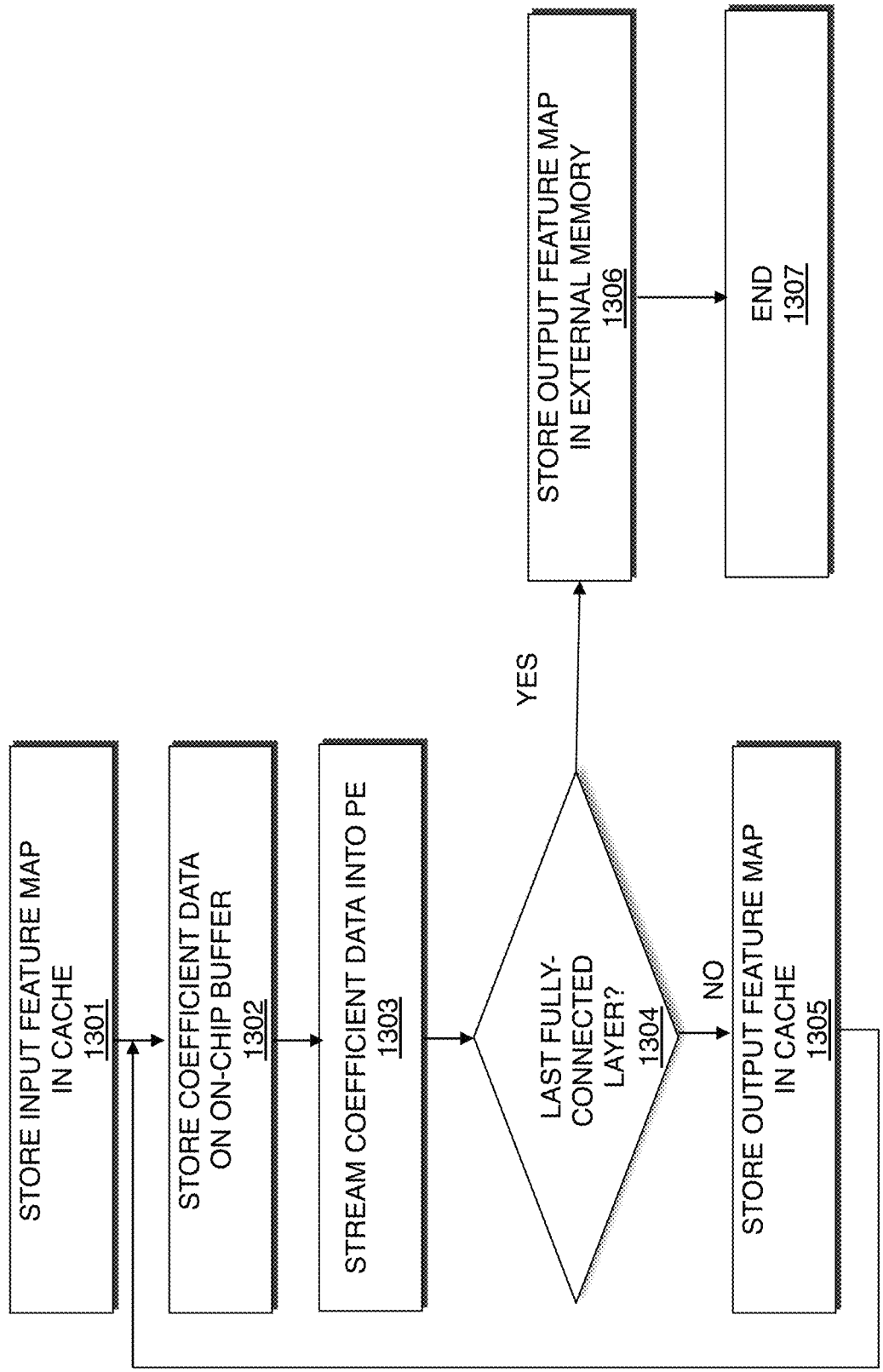
FIG. 13 is a flow chart illustrating a method for managing data input and output on a CNN accelerator to utilize one or more processing elements to implement a fully connected layer according to an exemplary embodiment of the present invention.

FIG. 13 is a flow chart illustrating a method for managing data input and output on a CNN accelerator to utilize one or more processing elements to implement a fully connected layer according to an exemplary embodiment of the present invention. The method described in FIG. 13 may be used to implement procedure 1104 illustrated in FIG. 11. At 1301, an input feature map is stored in a cache of a processing element.

At 1302, coefficient data is stored on an on-chip buffer.

At 1303, the coefficient data is streamed into the processing element from the on-chip buffer. The input feature map stored in the cache of the processing element and the coefficient data streamed from the on-chip buffer may be processed by the processing element in the manner described with reference to FIG. 4 to generate an output feature map.

At 1304, it is determined whether a present fully-connected layer is a last fully-connected layer to be implemented for processing the feature map. If the present fully-connected layer is not the last fully-connected layer to be implemented, control proceeds to 1305. If the present fully-connected layer is the last fully-connected layer to be implemented, control proceeds to 1306.

At 1305, the generated output feature map is stored in the cache. Control returns to 1302.

At 1306, the generated output feature map is stored in an external memory. The external memory may reside off the target implementing the CNN accelerator. Control proceeds to 1307 where the procedure is terminated.

FIGS. 11-13 are flow charts that illustrate embodiments of the present invention. The procedures described in these figures may be performed by a sequencer unit implemented by a CNN accelerator, and may be used to program the sequencer unit as described with reference to 503 in FIG. 5. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 14:
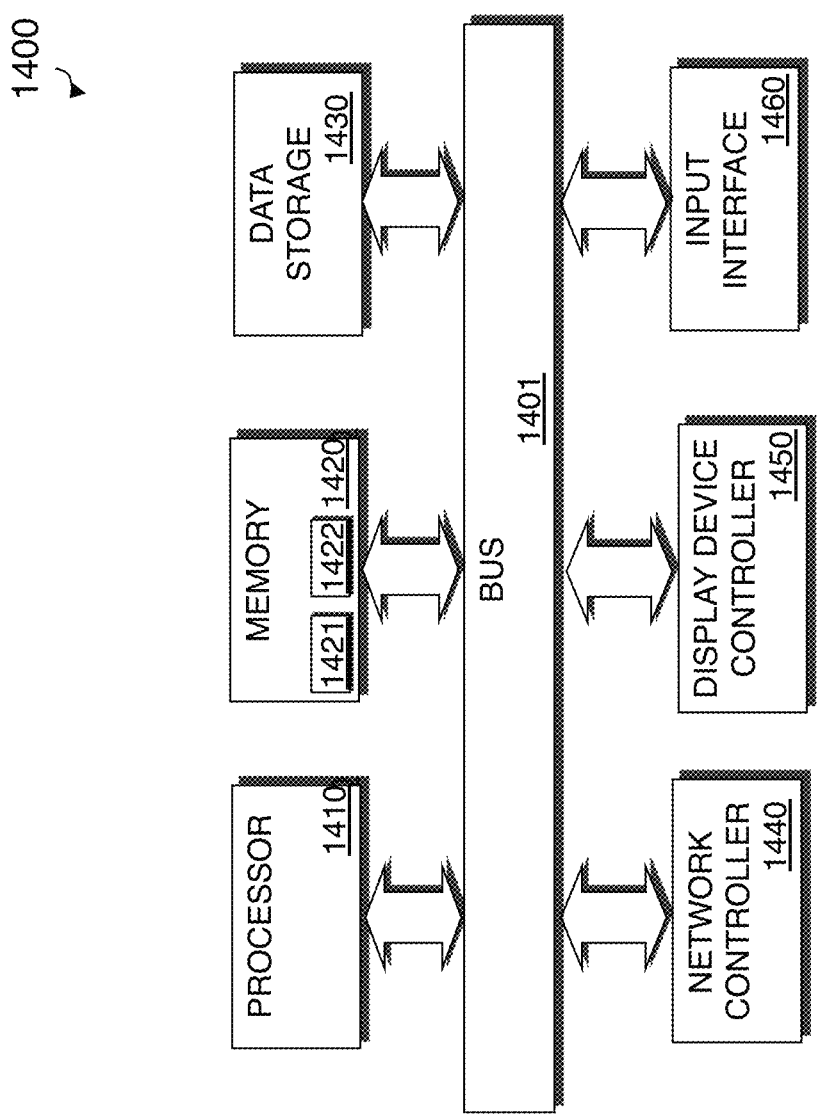
FIG. 14 illustrates a block diagram of a computer system implementing an electronic design automation tool and a CNN accelerator configuration tool according to an exemplary embodiment of the present invention.

FIG. 14 illustrates a block diagram of a computer system 1400 implementing a system designer according to an embodiment of the present invention. The computer system 1400 includes a processor 1410 that process data signals. The processor 1410 is coupled to a bus 1401 or other switch fabric that transmits data signals between processor 1410 and other components in the computer system 1400. The computer system 1400 includes a memory 1420. The memory 1420 may store instructions and code represented by data signals that may be executed by the processor 1410. A data storage device 1430 is also coupled to the bus 1401.

A network controller 1440 is coupled to the bus 1401. The network controller 1440 may link the computer system 1400 to a network of computers (not shown) and supports communication among the machines. A display device controller 1450 is coupled to the bus 1401. The display device controller 1450 allows coupling of a display device (not shown) to the computer system 1400 and acts as an interface between the display device and the computer system 1400. An input interface 1460 is coupled to the bus 1401. The input interface 1460 allows coupling of an input device (not shown) to the computer system 1400 and transmits data signals from the input device to the computer system 1400.

An EDA tool 1421 may reside in the memory 1420 and be executed by the processor 1410. According to an embodiment of the present invention, the EDA tool 1421 operates to identify features of a CNN accelerator which includes characteristics and parameters of the CNN accelerator, and resources of a target that the CNN accelerator is to be implemented on. The EDA tool 1421 generates a design for the CNN accelerator in response to the features of the CNN accelerator and the resources of the target.

A CNN accelerator configuration tool 1422 may reside in the memory 1420 and be executed by the processor 1410. According to an embodiment of the present invention, the CNN accelerator configuration tool 1422 identifies a CNN algorithm to execute on a CNN accelerator, identifies a variation of the CNN accelerator that supports execution of the CNN algorithm, and sets configurable status registers on a target to support the variation of the CNN accelerator.

Figure 15:
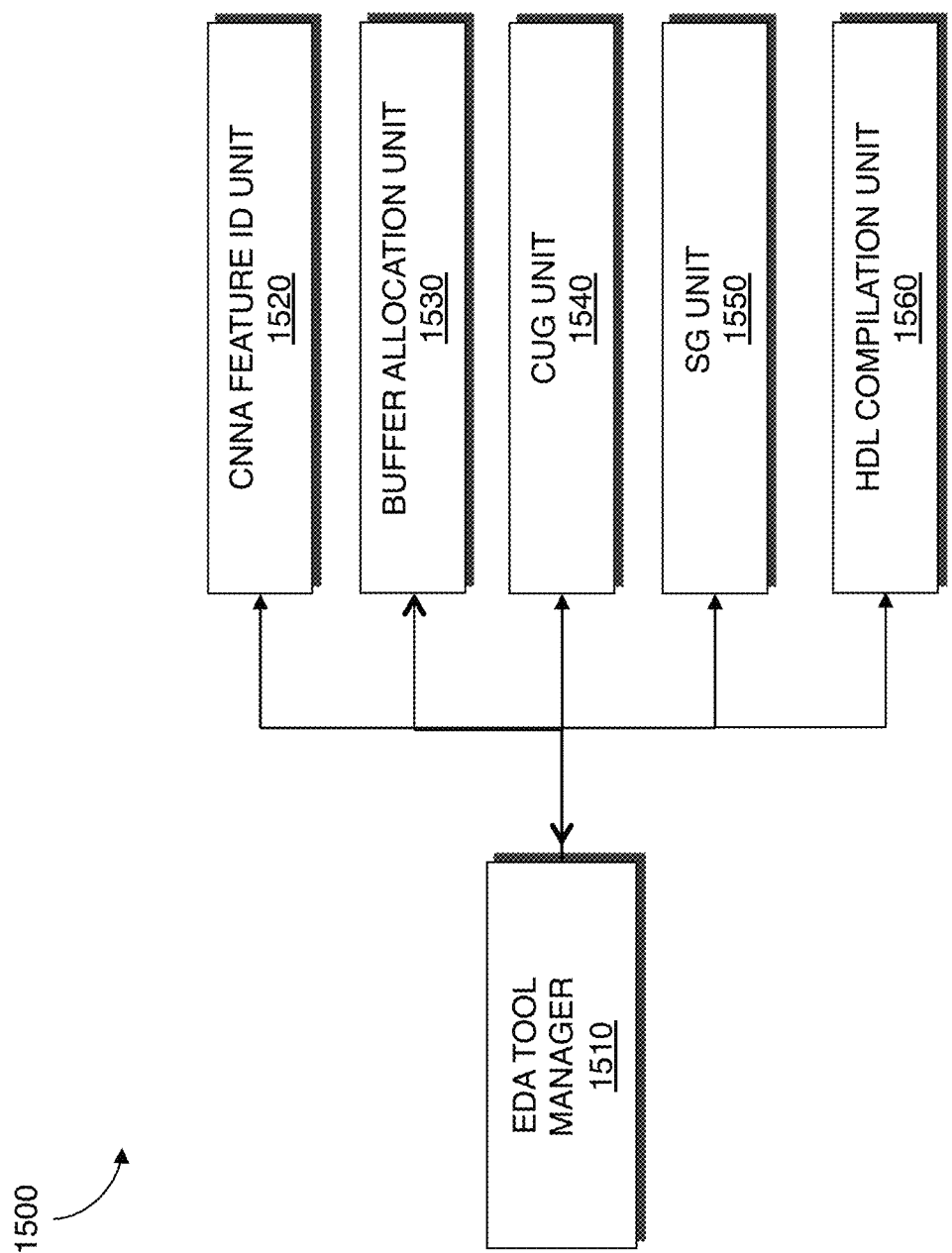
FIG. 15 is a block diagram of an electronic design automation tool according to an exemplary embodiment of the present invention.

FIG. 15 illustrates an EDA tool 1500 according to an embodiment of the present invention. The EDA tool 1500 may be used to implement the EDA tool 1421 illustrated in FIG. 14. The EDA tool 1500 may be used for designing a system such as a CNN accelerator on one or more target devices such as an FPGA, ASIC, structured ASIC, or other circuitry. FIG. 15 illustrates modules implementing an embodiment of the EDA tool 1500. According to one embodiment, the modules represent software modules and designing a CNN accelerator may be performed by a computer system such as the one illustrated in FIG. 14 executing sequences of instructions represented by the modules shown in FIG. 15. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The EDA tool 1500 includes an EDA tool manager 1510. The EDA tool manager 1510 is connected to and transmits data between the other components of the EDA tool 1500. The EDA tool manager 1510 provides an interface that allows a user such as a designer to input data into the EDA tool 1500.

The EDA tool 1500 includes a CNN accelerator feature identification unit 1520. According to an embodiment of the present invention, the CNN accelerator feature identification unit 1520 identifies characteristics of the CNN accelerator by identifying characteristics of one or more CNN algorithms that the CNN accelerator is desired to support. The characteristics of a CNN algorithm may include a number and sequence of stages of layers, such as convolution and noise filtering layers. The noise filtering layers may include, for example, pooling, normalization, and ReLU layers. The characteristics of the CNN algorithm may also include sizes and coefficients of filters, and sizes and strides of images to be processed. The CNN feature identification unit 1520 also identifies parameters of the CNN accelerator by identifying parameters for the one or more CNN algorithms that the CNN accelerator is desired to support. The parameters of a CNN algorithm may include a number of kernels to instantiate for each layer identified, and a number of multiplications to execute for each cycle of a kernel, and other parameters. The CNN feature identification unit 1520 also identifies resources available on a target to implement the CNN accelerator. The resources available may include a number and type of memory blocks, DSP blocks, and other components and processing units on a target. According to an embodiment of the present invention where a plurality of CNN algorithms are desired to be executed on the CNN accelerator, a range or plurality of characteristics and parameters may be identified for the CNN accelerator.

The EDA tool 1500 includes a buffer allocation unit 1530. According to an embodiment of the present invention, the buffer allocation unit 1530 assigns buffers to the CNN accelerator at an appropriate size to support a size of images to be processed by the CNN accelerator.

The EDA tool 1500 includes a computation unit generation unit 1540. The computation unit generation unit 1540 generates computation units such as processing element arrays to support the CNN algorithms to be performed by the CNN accelerator. According to an embodiment of the present invention, the processing element arrays include kernels that perform convolution and noise filtering. The processing element arrays may be generated to optimize performance utilizing resources available on a target used to implement the CNN accelerator.

The EDA tool 1500 includes a sequencer generation unit 1550. The sequencer generation unit 1550 generates and programs a sequencer unit that coordinates transmission of data to appropriate processing element arrays on the CNN accelerator, kernels in the processing element arrays, and components in the kernels at appropriate times in order to time multiplex computations on the processing element arrays. According to an embodiment of the present invention, the sequencer unit may be programmed to perform the procedures illustrated with reference to FIGS. 11-13.

According to an embodiment of the present invention, information from the buffer allocation unit 1530, computation unit generation unit 1540, and sequencer generation unit 1550 is used to generate a description of the design of the CNN accelerator. The description of the design may be in HDL format or other format.

The EDA tool 1500 includes an HDL compilation unit 1560. The HDL compilation unit 1560 compiles a description of the design for the CNN accelerator for the target. According to an embodiment of the present invention, compilation involves performing synthesis, placement, routing, and timing analysis procedures on the HDL description of the design. The compiled design for the CNN accelerator may support a range of CNN variants. It should be appreciated that the EDA tool 1500 may perform the procedures described with reference to FIGS. 1-4.

Figure 16:
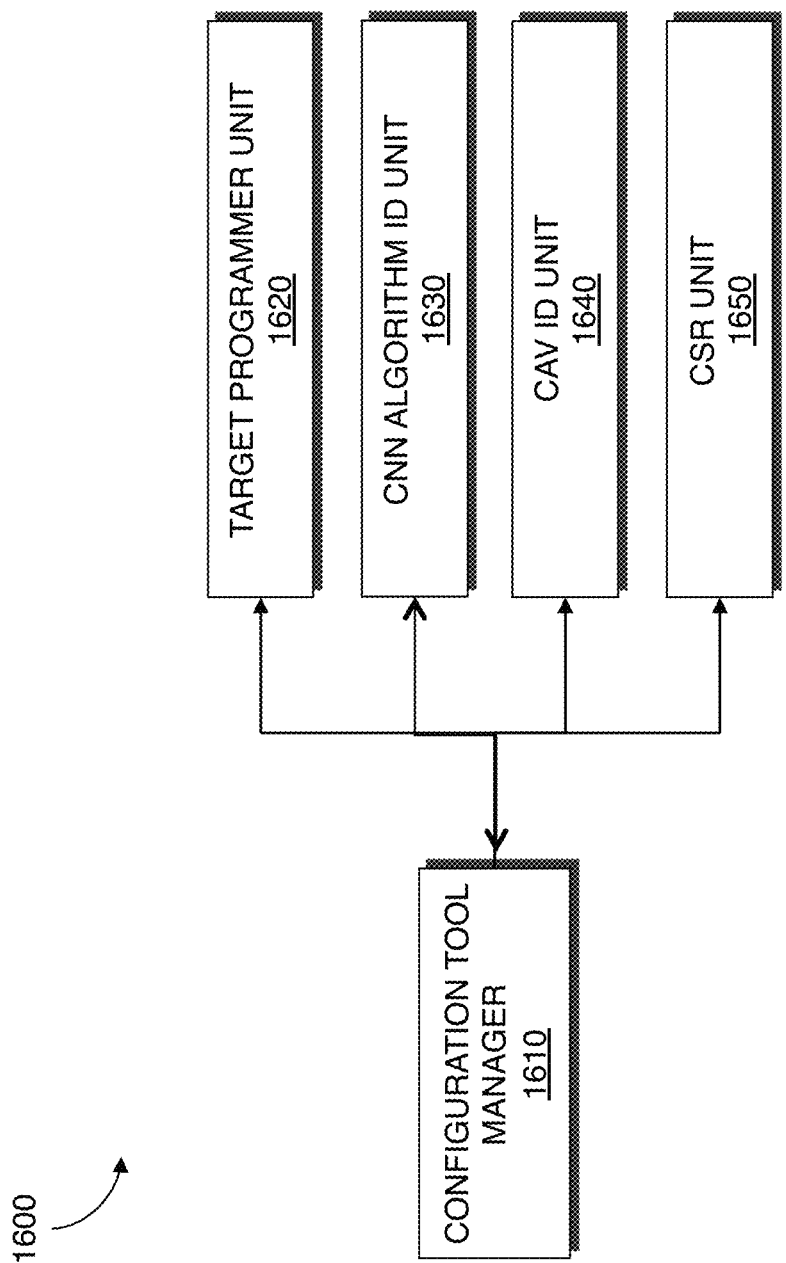
FIG. 16 illustrates a block diagram of a CNN accelerator configuration tool according to an exemplary embodiment of the present invention.

FIG. 16 illustrates a CNN accelerator configuration tool 1600 according to an embodiment of the present invention. The CNN accelerator configuration tool 1600 may be used to implement the configuration tool 1422 illustrated in FIG. 14. The CNN accelerator configuration tool 1600 may be used to configure a system such as a CNN accelerator on one or more target devices such as an FPGA, ASIC, structured ASIC, or other circuitry. FIG. 16 illustrates modules implementing an embodiment of the CNN accelerator configuration tool 1600. According to one embodiment, the modules represent software modules and configuring a CNN accelerator may be performed by a computer system such as the one illustrated in FIG. 14 executing sequences of instructions represented by the modules shown in FIG. 16. Execution of the sequences of instructions causes the computer system to support configuration of a CNN accelerator as will be described hereafter. In alternate embodiments, hard-wire circuitry may be used in place of or in combination with software instructions to implement embodiments of present invention. Thus, embodiments of present invention are not limited to any specific combination of hardware circuitry and software.

The CNN accelerator configuration tool 1600 includes a configuration tool manager 1610. The configuration tool manager 1610 is connected to and transmits data between the other components of the configuration tool manager 1600. The configuration tool manager 1610 provides an interface that allows a user to input data into the configuration tool 1600.

The CNN accelerator configuration tool 1600 includes a target programmer unit 1620. The target programmer unit 1620 programs the target to implement a CNN accelerator. According to an embodiment of the present invention, programming the target involves programming one or more target devices with a configuration file that physically transforms the one or more target devices into the design of the CNN accelerator.

The CNN accelerator configuration tool 1600 includes a CNN algorithm identification unit 1630. The CNN algorithm identification unit 1630 identifies a CNN algorithm to be executed by the CNN accelerator. According to an embodiment of the present invention, the CNN algorithm to be executed may be identified from user input or from another source.

The CNN accelerator configuration tool 1600 includes a CNN accelerator variation identification unit 1640. The CNN accelerator variation identification unit 1640 identifies an appropriate variation of the CNN accelerator that supports the CNN algorithm to be executed. According to an embodiment of the present invention, the appropriate variation of the CNN accelerator may be identified from user input or from another source.

The CNN accelerator configuration tool 1600 includes a configurable status register unit 1650. The configurable status register unit 1650 sets one or more configurable status registers to support the variation of the CNN accelerator identified. According to an embodiment of the present invention, setting a configurable status register may add or subtract a convolution layer on the CNN accelerator, add or subtract one or more pooling layers, or change a size of a filter.

It should be appreciated that the CNN algorithm identification unit 1630 may make a determination as to whether a new CNN algorithm is to be executed by the CNN accelerator. If a determination is made that a new CNN algorithm is to be executed by the CNN accelerator, an appropriate CNN accelerator variation may be identified by configuration accelerator variation identification unit 1640, and configurable status registers may be set by the configurable status register unit 1650 to support the CNN accelerator variation. It should be appreciated that the CNN accelerator configuration tool 1600 may perform the procedures described with reference to FIG. 5.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 17:
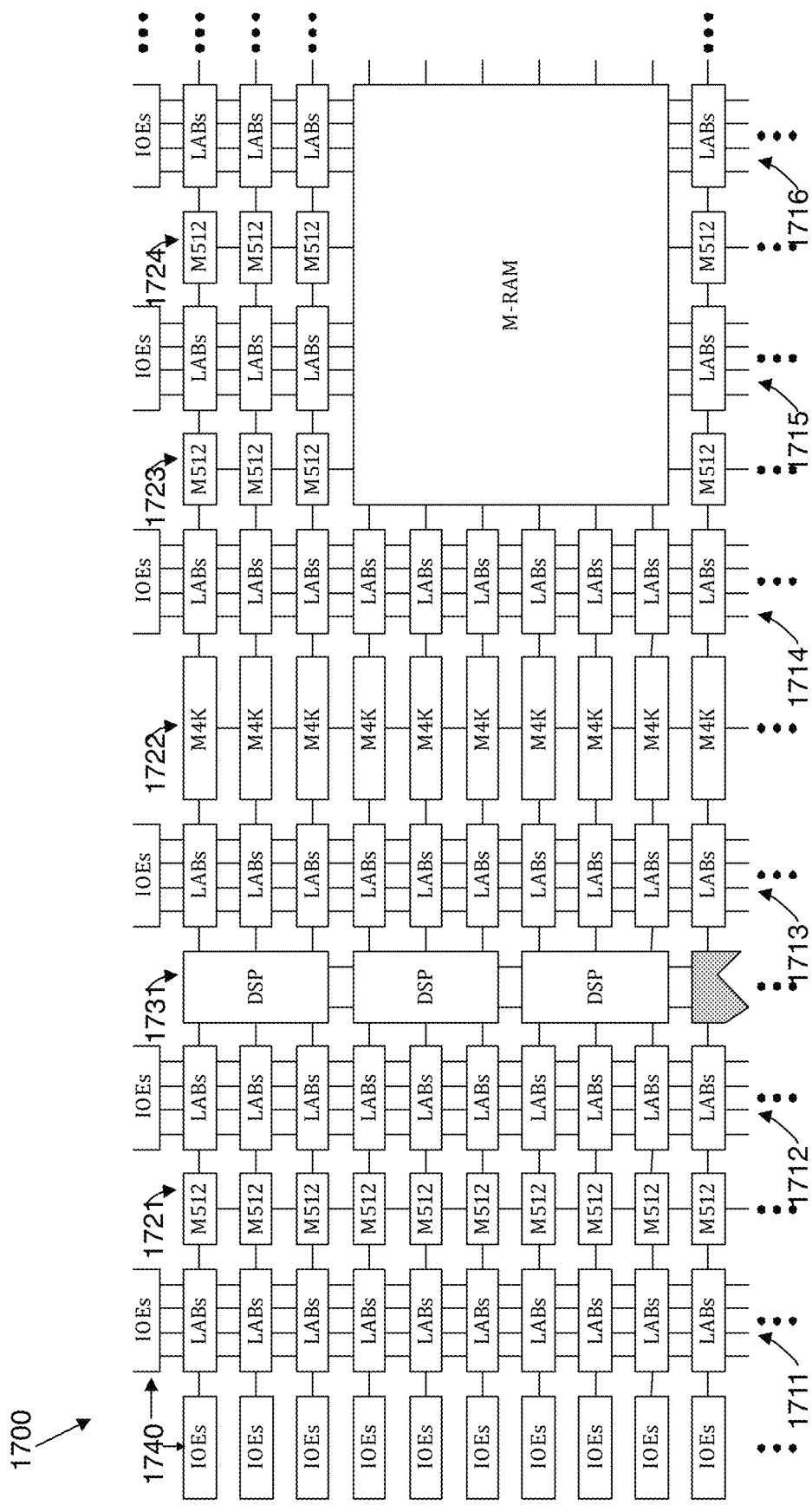
FIG. 17 illustrates an exemplary target device according to an embodiment of the present invention.

FIG. 17 illustrates a device 1700 that may be used to implement a target device according to an embodiment of the present invention. The device 1700 is a field programmable gate array (FPGA) that includes a plurality of logic-array blocks (LABs). Each LAB may be formed from a plurality of logic blocks, carry chains, LAB control signals, look up table (LUT) chain, and register chain connection lines, and other components and interconnects. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an embodiment of the present invention, the logic block may include one or more adaptive logic modules (ALMs), such as those found in Stratix devices manufactured by Altera Corporation. ALMs may be configured to implement logic functions, arithmetic functions, and register functions. LABs are grouped into rows and columns across the device 1700. Columns of LABs are shown as 1711-1716. It should be appreciated that the logic block may include additional or alternate components.

The device 1700 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1700. Columns of memory blocks are shown as 1721-1724. According to an embodiment of the present invention, CSRs may be implemented by one or more of the memory blocks in columns 1721-1724. The CSRs may be used to provide status to kernels in order to configure a CNN accelerator according to desired features of a CNN. This allows a CNN accelerator implemented by the target device 1700 to be configured during runtime.

The device 1700 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1700 and are shown as 1731.

The device 1700 includes a plurality of input/output elements (IOEs) 1740. Each IOE feeds an IO pin (not shown) on the device 1700. The IOEs 1740 are located at the end of LAB rows and columns around the periphery of the device 1700. Each IOE may include a bidirectional IO buffer and a plurality of registers for registering input, output, and output-enable signals.

The device 1700 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for implementing a convolutional neural network (CNN) accelerator on a target, comprising:
   storing first coefficient data in a cache in a plurality of processing elements;
   utilizing the plurality of processing elements to implement a standard convolution layer to generate a first output feature map in response to receiving a first input feature map from a buffer and in response to receiving the first coefficient data from the cache in the plurality of processing elements, wherein the plurality of processing elements are implemented by resources on a programmable logic device;
   modifying a configuration of the CNN accelerator to change a data flow between components on the CNN accelerator by storing a second input feature map in the cache in the plurality of processing elements; and
   utilizing the plurality of processing elements to implement a fully connected layer to generate a second output feature map in response to receiving second coefficient data from the buffer and in response to receiving the second input feature map from the cache in the plurality of processing elements.

2. The method of claim 1, wherein modifying the configuration of the CNN accelerator further comprises:
   storing the second coefficient data in the buffer on the target; and
   streaming the second coefficient data into the plurality of processing elements.

3. The method of claim 2 further comprising:
   storing the second output feature map in the cache if another fully connected layer is to be implemented; and
   storing the second output feature map in a memory external to the target if no additional fully connected layer is to be implemented.

4. The method of claim 1 further comprising setting an initial configuration of the CNN accelerator to implement the standard convolution layer comprising:
   storing the first input feature map in the buffer on the target; and
   streaming the first input feature map into the plurality of processing elements.

5. The method of claim 4 further comprising:
   storing the first output feature map in the buffer on the target if another standard convolution layer is to be implemented; and
   storing the first output feature map in a memory external to the target if no additional standard convolution layer is to be implemented.

6. The method of claim 1, wherein the modifying is performed by a sequencer unit residing on the CNN accelerator during runtime of the CNN accelerator.

7. The method of claim 1, wherein the plurality of processing elements implements either the standard convolution layer or the fully connected layer at an instance of time.

8. The method of claim 1, wherein each of the plurality of processing elements comprises:
   a cache;
   a computation unit that performs dot product operations; and
   an accumulator unit.

9. The method of claim 1, wherein the standard convolution layer generates the first output feature map that includes outputs which are the sum of multiplications of different sets of data from the first input feature map and the first coefficient data.

10. The method of claim 1, wherein the fully connected layer generates the second output feature map that includes outputs which are the sum of multiplications of a fixed set of data from the second input feature map and different sets of the second coefficient data.

11. A convolutional neural network (CNN) accelerator implemented on a target, comprising:
   a sequencer unit that coordinates a first data flow between components on the target during a first configuration and that coordinates a second data flow between components on the target during a second configuration; and
   a plurality of processing elements that implement a standard convolutional layer during the first configuration to generate a first output feature map in response to receiving a first input feature map from a buffer and in response to receiving first coefficient data from a cache in the plurality of processing elements, wherein the first data flow comprises storing the first coefficient data in the cache in the plurality of processing elements, wherein the plurality of processing elements implement a fully connected layer during the second configuration to generate a second output feature map in response to receiving second coefficient data from the buffer and in response to receiving a second input feature map from the cache in the plurality of processing elements, wherein the second data flow comprises storing the second input feature map in the cache in the plurality of processing elements, and wherein the plurality of processing elements are implemented by resources on a programmable logic device.

12. The CNN accelerator of claim 11, wherein each of the plurality of processing elements comprises:
   a cache;
   a computation unit that performs dot product operations; and
   an accumulator unit.

13. The CNN accelerator of claim 11, wherein the plurality of processing elements implement either the standard convolution layer or the fully connected layer at an instance of time.

14. The CNN accelerator of claim 11, wherein the first data flow comprises:
   storing the first input feature map in the buffer on the target; and
   streaming the first input feature map into the plurality of processing elements.

15. The CNN accelerator of claim 14 further comprising:
   storing the first output feature map in the buffer on the target if another standard convolution layer is to be implemented; and
   storing the first output feature map in a memory external to the target if no additional standard convolution layer is to be implemented.

16. The CNN accelerator of claim 11, wherein the second data flow further comprises:
   storing the second coefficient data in the buffer on the target; and
   streaming the second coefficient data into the plurality of processing elements.

17. The CNN accelerator of claim 16 further comprising:
   storing the second output feature map in the cache if another fully connected layer is to be implemented; and
   storing the second output feature map in a memory external to the target if no additional fully connected layer is to be implemented.

18. A non-transitory computer readable medium including a sequence of instructions stored thereon for causing a computer to execute a method for implementing a convolutional neural network (CNN) accelerator on a target, comprising:
   storing first coefficient data in a cache in a plurality of processing elements;
   utilizing the plurality of processing elements to implement a standard convolution layer to generate a first output feature map in response to receiving a first input feature map from a buffer and in response to receiving the first coefficient data from the cache in the plurality of processing elements, wherein the plurality of processing elements are implemented by resources on a programmable logic device;
   modifying a configuration of the CNN accelerator to change a data flow between components on the CNN accelerator by storing a second input feature map in the cache in the plurality of processing elements; and
   utilizing the plurality of processing elements to implement a fully connected layer to generate a second output feature map in response to receiving second coefficient data from the buffer and in response to receiving the second input feature map from the cache in the plurality of processing elements.

19. The non-transitory computer readable medium of claim 18, wherein modifying the configuration of the CNN accelerator comprises:
   storing the second coefficient data in the buffer on the target; and
   streaming the second coefficient data into the plurality of processing elements.

20. The non-transitory computer readable medium of claim 18, wherein the plurality of processing elements implements either the standard convolution layer or the fully connected layer at an instance of time.

* * * * *